United States Patent
Kludt et al.

(10) Patent No.: US 8,842,765 B2
(45) Date of Patent: Sep. 23, 2014

(54) BEAMFORMER CONFIGURABLE FOR CONNECTING A VARIABLE NUMBER OF ANTENNAS AND RADIO CIRCUITS

(71) Applicant: Magnolia Broadband Inc., Warren, NJ (US)

(72) Inventors: Kenneth Kludt, San Jose, CA (US); Haim Harel, New York, NY (US)

(73) Assignee: Magnolia Broadband Inc., Englewood, NJ (US)

( * ) Notice: Subject to any disclaimer, the term of this patent is extended or adjusted under 35 U.S.C. 154(b) by 0 days.

(21) Appl. No.: 13/776,068

(22) Filed: Feb. 25, 2013

(65) Prior Publication Data

US 2013/0324055 A1    Dec. 5, 2013

Related U.S. Application Data

(63) Continuation-in-part of application No. 13/630,146, filed on Sep. 28, 2012.

(60) Provisional application No. 61/652,743, filed on May 29, 2012, provisional application No. 61/657,999, filed on Jun. 11, 2012, provisional application No. 61/665,592, filed on Jun. 28, 2012, provisional application No. 61/658,015, filed on Jun. 11, 2012, provisional application No. 61/658,009, filed on Jun. 11, 2012, provisional application No. 61/665,600, filed on Jun. 28, 2012, provisional application No. 61/671,417, filed on Jul. 13, 2012.

(51) Int. Cl.
*H04B 1/00* (2006.01)
*H04B 7/08* (2006.01)
*H04B 7/04* (2006.01)

(52) U.S. Cl.
CPC ............ *H04B 7/043* (2013.01); *H04B 1/00* (2013.01); *H04B 7/086* (2013.01)
USPC ............................ 375/267; 375/260; 375/259

(58) Field of Classification Search
CPC ................................................... H04B 7/043
USPC .............................. 375/267, 260, 259
See application file for complete search history.

(56) References Cited

U.S. PATENT DOCUMENTS 4,044,359 A    8/1977    Applebaum et al.
4,079,318 A    3/1978    Kinoshita
(Continued)

FOREIGN PATENT DOCUMENTS

EP    1 867 177    5/2010
EP    2 234 355    9/2010
(Continued)

OTHER PUBLICATIONS

Office Action issued by the United States Patent and Trademark Office for U.S. Appl. No. 13/630,146 dated Jan. 22, 2013.
(Continued)

*Primary Examiner* — Michael Neff
(74) *Attorney, Agent, or Firm* — Pearl Cohen Zedek Latzer Baratz LLP

(57) ABSTRACT

A reconfigurable RF routing module may include M RF inputs and N RF outputs, wherein M is greater than N; a plurality of RF switches arranged to select between incoming RF signals; a plurality of RF combiners arranged to combine RF signals to a single RF signal; and a plurality of RF couplers, each associated with a transfer switch and a specified attenuation, wherein the specified attenuation of each one of the plurality of RF couplers is selected so that the RF inputs of each one of the plurality of the RF combiners are combined in a balanced manner, wherein the switches, the combiners, and the RF couplers are configured to route any of 1 to M of the inputs into each of the N outputs.

15 Claims, 6 Drawing Sheets

(56) References Cited

U.S. PATENT DOCUMENTS

| | | | |
|---|---|---|---|
| 4,359,738 A | 11/1982 | Lewis | |
| 4,540,985 A | 9/1985 | Clancy et al. | |
| 4,628,320 A | 12/1986 | Downie | |
| 5,162,805 A | 11/1992 | Cantrell | |
| 5,363,104 A | 11/1994 | Richmond | |
| 5,444,762 A | 8/1995 | Frey et al. | |
| 5,732,075 A | 3/1998 | Tangemann et al. | |
| 5,915,215 A | 6/1999 | Williams et al. | |
| 5,936,577 A | 8/1999 | Shoki et al. | |
| 5,940,033 A | 8/1999 | Locher et al. | |
| 6,018,317 A | 1/2000 | Dogan et al. | |
| 6,046,655 A * | 4/2000 | Cipolla | 333/137 |
| 6,101,399 A | 8/2000 | Raleigh et al. | |
| 6,215,812 B1 | 4/2001 | Young et al. | |
| 6,226,507 B1 | 5/2001 | Ramesh et al. | |
| 6,230,123 B1 | 5/2001 | Mekuria et al. | |
| 6,297,772 B1 | 10/2001 | Lewis | |
| 6,321,077 B1 | 11/2001 | Saitoh et al. | |
| 6,335,953 B1 | 1/2002 | Sanderford et al. | |
| 6,377,783 B1 * | 4/2002 | Lo et al. | 455/101 |
| 6,584,115 B1 | 6/2003 | Suzuki | |
| 6,697,633 B1 | 2/2004 | Dogan et al. | |
| 6,834,073 B1 | 12/2004 | Miller et al. | |
| 6,927,646 B2 | 8/2005 | Niemi | |
| 6,975,582 B1 | 12/2005 | Karabinis et al. | |
| 6,987,958 B1 | 1/2006 | Lo et al. | |
| 7,068,628 B2 | 6/2006 | Li et al. | |
| 7,177,663 B2 | 2/2007 | Axness et al. | |
| 7,257,425 B2 | 8/2007 | Wang et al. | |
| 7,299,072 B2 | 11/2007 | Ninomiya | |
| 7,392,015 B1 | 6/2008 | Farlow et al. | |
| 7,499,109 B2 | 3/2009 | Kim et al. | |
| 7,606,528 B2 | 10/2009 | Mesecher | |
| 7,719,993 B2 | 5/2010 | Li et al. | |
| 7,742,000 B2 | 6/2010 | Mohamadi | |
| 7,769,107 B2 | 8/2010 | Sandhu et al. | |
| 7,898,478 B2 | 3/2011 | Niu et al. | |
| 7,970,366 B2 | 6/2011 | Arita et al. | |
| 8,078,109 B1 | 12/2011 | Mulcay | |
| 8,115,679 B2 | 2/2012 | Falk | |
| 8,155,613 B2 | 4/2012 | Kent et al. | |
| 8,280,443 B2 | 10/2012 | Tao et al. | |
| 8,294,625 B2 | 10/2012 | Kittinger et al. | |
| 8,306,012 B2 | 11/2012 | Lindoff et al. | |
| 8,315,671 B2 | 11/2012 | Kuwahara et al. | |
| 8,369,436 B2 * | 2/2013 | Stirling-Gallacher | 375/267 |
| 8,520,657 B2 | 8/2013 | Rofougaran | |
| 8,526,886 B2 | 9/2013 | Wu et al. | |
| 8,599,955 B1 | 12/2013 | Kludt et al. | |
| 8,599,979 B2 | 12/2013 | Farag et al. | |
| 8,649,458 B2 | 2/2014 | Kludt et al. | |
| 2001/0029326 A1 | 10/2001 | Diab et al. | |
| 2001/0038665 A1 | 11/2001 | Baltersee et al. | |
| 2002/0051430 A1 | 5/2002 | Kasami et al. | |
| 2002/0065107 A1 | 5/2002 | Harel et al. | |
| 2002/0085643 A1 | 7/2002 | Kitchener et al. | |
| 2002/0107013 A1 | 8/2002 | Fitzgerald | |
| 2002/0115474 A1 | 8/2002 | Yoshino et al. | |
| 2003/0114162 A1 | 6/2003 | Chheda et al. | |
| 2003/0153322 A1 | 8/2003 | Burke et al. | |
| 2003/0203717 A1 | 10/2003 | Chuprun et al. | |
| 2004/0056795 A1 | 3/2004 | Ericson et al. | |
| 2004/0081144 A1 | 4/2004 | Martin et al. | |
| 2004/0121810 A1 | 6/2004 | Goransson et al. | |
| 2004/0125899 A1 | 7/2004 | Li et al. | |
| 2004/0125900 A1 | 7/2004 | Liu et al. | |
| 2004/0142696 A1 | 7/2004 | Saunders et al. | |
| 2004/0166902 A1 | 8/2004 | Castellano et al. | |
| 2004/0228388 A1 | 11/2004 | Salmenkaita | |
| 2004/0235527 A1 | 11/2004 | Reudink et al. | |
| 2005/0068230 A1 | 3/2005 | Munoz et al. | |
| 2005/0068918 A1 | 3/2005 | Mantravadi et al. | |
| 2005/0075140 A1 | 4/2005 | Famolari | |
| 2005/0129155 A1 | 6/2005 | Hoshino | |
| 2005/0147023 A1 | 7/2005 | Stephens et al. | |
| 2005/0245224 A1 | 11/2005 | Kurioka | |
| 2005/0250544 A1 | 11/2005 | Grant et al. | |
| 2006/0041676 A1 | 2/2006 | Sherman | |
| 2006/0094372 A1 | 5/2006 | Ahn et al. | |
| 2006/0135097 A1 | 6/2006 | Wang et al. | |
| 2006/0227854 A1 | 10/2006 | McCloud et al. | |
| 2006/0270343 A1 | 11/2006 | Cha et al. | |
| 2006/0271969 A1 | 11/2006 | Takizawa et al. | |
| 2006/0285507 A1 | 12/2006 | Kinder et al. | |
| 2007/0076675 A1 | 4/2007 | Chen | |
| 2007/0093261 A1 | 4/2007 | Hou et al. | |
| 2007/0152903 A1 | 7/2007 | Lin et al. | |
| 2007/0223380 A1 | 9/2007 | Gilbert et al. | |
| 2008/0043867 A1 | 2/2008 | Blanz et al. | |
| 2008/0051037 A1 | 2/2008 | Molnar et al. | |
| 2008/0144737 A1 | 6/2008 | Naguib | |
| 2008/0165732 A1 | 7/2008 | Kim et al. | |
| 2008/0238808 A1 | 10/2008 | Arita et al. | |
| 2008/0280571 A1 | 11/2008 | Rofougaran et al. | |
| 2008/0285637 A1 | 11/2008 | Liu et al. | |
| 2009/0028225 A1 | 1/2009 | Runyon et al. | |
| 2009/0046638 A1 | 2/2009 | Rappaport et al. | |
| 2009/0058724 A1 | 3/2009 | Xia et al. | |
| 2009/0121935 A1 | 5/2009 | Xia et al. | |
| 2009/0137206 A1 | 5/2009 | Sherman et al. | |
| 2009/0154419 A1 | 6/2009 | Yoshida et al. | |
| 2009/0190541 A1 | 7/2009 | Abedi | |
| 2009/0268616 A1 | 10/2009 | Hosomi | |
| 2009/0322610 A1 | 12/2009 | Hants et al. | |
| 2010/0002656 A1 | 1/2010 | Ji et al. | |
| 2010/0037111 A1 | 2/2010 | Ziaja et al. | |
| 2010/0040369 A1 | 2/2010 | Zhao et al. | |
| 2010/0117890 A1 | 5/2010 | Vook et al. | |
| 2010/0135420 A1 | 6/2010 | Xu et al. | |
| 2010/0150013 A1 | 6/2010 | Hara et al. | |
| 2010/0172429 A1 | 7/2010 | Nagahama et al. | |
| 2010/0195560 A1 | 8/2010 | Nozaki et al. | |
| 2010/0222011 A1 | 9/2010 | Behzad | |
| 2010/0234071 A1 | 9/2010 | Shabtay et al. | |
| 2010/0278063 A1 | 11/2010 | Kim et al. | |
| 2010/0283692 A1 | 11/2010 | Achour et al. | |
| 2010/0285752 A1 | 11/2010 | Lakshmanan et al. | |
| 2010/0303170 A1 | 12/2010 | Zhu et al. | |
| 2010/0316043 A1 | 12/2010 | Doi et al. | |
| 2011/0019639 A1 | 1/2011 | Karaoguz et al. | |
| 2011/0032849 A1 | 2/2011 | Yeung et al. | |
| 2011/0032972 A1 | 2/2011 | Wang et al. | |
| 2011/0085532 A1 | 4/2011 | Scherzer et al. | |
| 2011/0105036 A1 | 5/2011 | Rao et al. | |
| 2011/0150050 A1 | 6/2011 | Trigui et al. | |
| 2011/0150066 A1 | 6/2011 | Fujimoto | |
| 2011/0163913 A1 | 7/2011 | Cohen et al. | |
| 2011/0205883 A1 | 8/2011 | Mihota | |
| 2011/0228742 A1 | 9/2011 | Honkasalo et al. | |
| 2011/0249576 A1 | 10/2011 | Chrisikos et al. | |
| 2011/0273977 A1 | 11/2011 | Shapira et al. | |
| 2011/0281541 A1 | 11/2011 | Borremans | |
| 2011/0299437 A1 * | 12/2011 | Mikhemar et al. | 370/278 |
| 2012/0014377 A1 | 1/2012 | Joergensen et al. | |
| 2012/0015603 A1 | 1/2012 | Proctor et al. | |
| 2012/0020396 A1 | 1/2012 | Hohne et al. | |
| 2012/0033761 A1 | 2/2012 | Guo et al. | |
| 2012/0034952 A1 * | 2/2012 | Lo et al. | 455/562.1 |
| 2012/0045003 A1 | 2/2012 | Li et al. | |
| 2012/0064838 A1 | 3/2012 | Miao et al. | |
| 2012/0076028 A1 | 3/2012 | Ko et al. | |
| 2012/0170672 A1 | 7/2012 | Sondur | |
| 2012/0201153 A1 | 8/2012 | Bharadia et al. | |
| 2012/0201173 A1 | 8/2012 | Jain et al. | |
| 2012/0207256 A1 | 8/2012 | Farag et al. | |
| 2012/0212372 A1 | 8/2012 | Petersson et al. | |
| 2012/0218962 A1 | 8/2012 | Kishiyama et al. | |
| 2012/0220331 A1 | 8/2012 | Luo et al. | |
| 2012/0230380 A1 | 9/2012 | Keusgen et al. | |
| 2012/0251031 A1 | 10/2012 | Suarez et al. | |
| 2012/0270544 A1 | 10/2012 | Shah | |
| 2012/0314570 A1 | 12/2012 | Forenza et al. | |
| 2013/0010623 A1 | 1/2013 | Golitschek | |
| 2013/0023225 A1 | 1/2013 | Weber | |

(56) References Cited

U.S. PATENT DOCUMENTS

| | | |
|---|---|---|
| 2013/0051283 A1 | 2/2013 | Lee et al. |
| 2013/0070741 A1 | 3/2013 | Li et al. |
| 2013/0079048 A1 | 3/2013 | Cai et al. |
| 2013/0094437 A1 | 4/2013 | Bhattacharya |
| 2013/0094621 A1 | 4/2013 | Luo et al. |
| 2013/0095780 A1 | 4/2013 | Prazan et al. |
| 2013/0101073 A1 | 4/2013 | Zai et al. |
| 2013/0156120 A1 | 6/2013 | Josiam et al. |
| 2013/0170388 A1 | 7/2013 | Ito et al. |
| 2013/0208619 A1 | 8/2013 | Kudo et al. |
| 2013/0223400 A1 | 8/2013 | Seo et al. |
| 2013/0229999 A1 | 9/2013 | Da Silva et al. |
| 2013/0242976 A1 | 9/2013 | Katayama et al. |
| 2013/0272437 A1 | 10/2013 | Eidson et al. |
| 2013/0331136 A1 | 12/2013 | Yang et al. |
| 2013/0343369 A1 | 12/2013 | Yamaura |
| 2014/0086077 A1 | 3/2014 | Safavi |
| 2014/0098681 A1 | 4/2014 | Stager et al. |

FOREIGN PATENT DOCUMENTS

| | | |
|---|---|---|
| JP | 2009-278444 | 11/2009 |
| WO | WO 03/047033 | 6/2003 |
| WO | WO 03/073645 | 9/2003 |
| WO | WO 2010/085854 | 8/2010 |
| WO | WO 2011/060058 | 5/2011 |

OTHER PUBLICATIONS

Office Action issued by the United States Patent and Trademark Office for U.S. Appl. No. 13/630,146 dated Mar. 27, 2013.
Office Action issued by the United States Patent and Trademark Office for U.S. Appl. No. 13/762,159 dated Apr. 16, 2013.
Office Action issued by the United States Patent and Trademark Office for U.S. Appl. No. 13/762,191 dated May 2, 2013.
Office Action issued by the United States Patent and Trademark Office for U.S. Appl. No. 13/762,188 dated May 15, 2013.
Office Action issued by the United States Patent and Trademark Office for U.S. Appl. No. 13/776,204 dated May 21, 2013.
Office Action issued by the United States Patent and Trademark Office for U.S. Appl. No. 13/770,255 dated Jun. 6, 2013.
Notice of Allowance issued by the United States Patent and Trademark Office for U.S. Appl. No. 13/762,159 dated Jun. 20, 2013.
Office Action issued by the United States Patent and Trademark Office for U.S. Appl. No. 13/775,886 dated Jul. 17, 2013.
Notice of Allowance issued by the United States Patent and Trademark Office for U.S. Appl. No. 13/762,191 dated Jul. 19, 2013.
Notice of Allowance issued by the United States Patent and Trademark Office for U.S. Appl. No. 13/630,146 dated Jul. 31, 2013.
Notice of Allowance issued by the United States Patent and Trademark Office for U.S. Appl. No. 13/762,188 dated Aug. 19, 2013.
Office Action issued by the United States Patent and Trademark Office for U.S. Appl. No. 13/955,320 dated Oct. 15, 2013.
Office Action issued by the United States Patent and Trademark Office for U.S. Appl. No. 13/776,204 dated Oct. 23, 2013.
Office Action issued by the United States Patent and Trademark Office for U.S. Appl. No. 13/925,454 dated Oct. 28, 2013.
Office Action issued by the United States Patent and Trademark Office for U.S. Appl. No. 13/955,194 dated Oct. 30, 2013.
Office Action issued by the United States Patent and Trademark Office for U.S. Appl. No. 14/013,190 dated Nov. 5, 2013.
Office Action issued by the United States Patent and Trademark Office for U.S. Appl. No. 14/010,771 dated Dec. 17, 2013.
Office Action issued by the United States Patent and Trademark Office for U.S. Appl. No. 14/065,182 dated Dec. 17, 2013.
Office Action issued by the United States Patent and Trademark Office for U.S. Appl. No. 14/068,863 dated Dec. 17, 2013.
Office Action issued by the United States Patent and Trademark Office for U.S. Appl. No. 14/011,521 dated Dec. 23, 2013.
Office Action issued by the United States Patent and Trademark Office for U.S. Appl. No. 13/775,886 dated Jan. 7, 2014.
Office Action issued by the United States Patent and Trademark Office for U.S. Appl. No. 14/018,965 dated Jan. 13, 2014.
Office Action issued by the United States Patent and Trademark Office for U.S. Appl. No. 13/858,302 dated Jan. 16, 2014.
Office Action issued by the United States Patent and Trademark Office for U.S. Appl. No. 14/042,020 dated Jan. 16, 2014.
Office Action issued by the United States Patent and Trademark Office for U.S. Appl. No. 14/102,539 dated Jan. 27, 2014.
Office Action issued by the United States Patent and Trademark Office for U.S. Appl. No. 14/087,376 dated Jan. 29, 2014.
Notice of Allowance issued by the United States Patent and Trademark Office for U.S. Appl. No. 13/776,204 dated Jan. 31, 2014.
Office Action issued by the United States Patent and Trademark Office for U.S. Appl. No. 14/094,644 dated Feb. 6, 2014.
Notice of Allowance issued by the United States Patent and Trademark Office for U.S. Appl. No. 13/955,320 dated Feb. 21, 2014.
Huang et al., "Antenna Mismatch and Calibration Problem in Coordinated Multi-point Transmission System," IET Communications, 2012, vol. 6, Issue 3, pp. 289-299.
Office Action issued by the United States Patent and Trademark Office for U.S. Appl. No. 14/109,904 dated Feb. 27, 2014.
Office Action issued by the United States Patent and Trademark Office for U.S. Appl. No. 13/925,454 dated Mar. 7, 2014.
Notice of Allowance for U.S. Appl. No. 14/172,500 dated Mar. 26, 2014.
Notice of Allowance for U.S. Appl. No. 14/065,182 dated Mar. 25, 2014.
Notice of Allowance for U.S. Appl. No. 14/068,863 dated Mar. 25, 2014.
Office Action for U.S. Appl. No. 14/010,771 dated Apr. 4, 2014.
Office Action for U.S. Appl. No. 14/085,352 dated Apr. 7, 2014.
Office Action for U.S. Appl. No. 13/889,150 dated Apr. 9, 2014.
Notice of Allowance for U.S. Appl. No. 13/955,194 dated Apr. 9, 2014.
Office Action for U.S. Appl. No. 14/097,765 dated Apr. 22, 2014.
Notice of Allowance for U.S. Appl. No. 14/087,376 dated May 9, 2014.
Office Action for U.S. Appl. No. 14/143,580 dated May 9, 2014.
Office Action for U.S. Appl. No. 14/013,190 dated May 20, 2014.
Office Action for U.S. Appl. No. 14/085,252 dated Jun. 18, 2014.
Office Action for U.S. Appl. No. 14/094,644 dated Jun. 24, 2014.
Notice of Allowance for U.S. Appl. No. 14/102,539 dated Jun. 24, 2014.
Office Action for U.S. Appl. No. 14/011,521 dated Jul. 1, 2014.
Notice of Allowance for U.S. Appl. No. 14/109,904 dated Jul. 2, 2014.
Notice of Allowance for U.S. Appl. No. 13/889,150 dated Jul. 8, 2014.
Office Action for U.S. Appl. No. 14/250,767 dated Jul. 10, 2014.
Notice of Allowance for U.S. Appl. No. 14/085,352 dated Jul. 23, 2014.
Notice of Allowance for U.S. Appl. No. 14/013,190 dated Jul. 25, 2014.
Office Action for U.S. Appl. No. 14/198,280 dated Jul. 29, 2014.
Office Action for U.S. Appl. No. 14/042,020 dated Jul. 31, 2014.
Notice of Allowance for U.S. Appl. No. 14/010,771 dated Aug. 6, 2014.

* cited by examiner

3dB, 4.77 dB AND 7 dB COUPLER PORTS $$Scplr_h := \frac{1}{\sqrt{CPLR_h}} \cdot \begin{bmatrix} 0 & -i & -\sqrt{CPLR_h - 1} & 0 \\ -i & 0 & 0 & -\sqrt{CPLR_h - 1} \\ -\sqrt{CPLR_h - 1} & 0 & 0 & -i \\ 0 & -\sqrt{CPLR_h - 1} & -i & 0 \end{bmatrix}$$

COUPLER SCATTERING MATRIX

Figure 5A $$Scplr = \begin{bmatrix} 0 & -0.707i & -0.707 & 0 \\ -0.707i & 0 & 0 & -0.707 \\ -0.707 & 0 & 0 & -0.707i \\ 0 & -0.707 & -0.707i & 0 \end{bmatrix}$$

1st CPLR SCATTERING MATRIX (3 dB, 90 DEGREE)

Figure 5B $$Scplr = \begin{bmatrix} 0 & -0.577i & -0.816 & 0 \\ -0.577i & 0 & 0 & -0.816 \\ -0.816 & 0 & 0 & -0.577i \\ 0 & -0.816 & -0.577i & 0 \end{bmatrix}$$

1st CPLR SCATTERING MATRIX (3 dB, 90 DEGREE)

Figure 5C $$Scplr = \begin{bmatrix} 0 & -0.447i & -0.894 & 0 \\ -0.447i & 0 & 0 & -0.894 \\ -0.894 & 0 & 0 & -0.447i \\ 0 & -0.894 & -0.447i & 0 \end{bmatrix}$$

3rd CPLR SCATTERING MATRIX (7 dB, 90 DEGREE)

Figure 5D

BEAMFORMER CONFIGURABLE FOR CONNECTING A VARIABLE NUMBER OF ANTENNAS AND RADIO CIRCUITS

CROSS-REFERENCE TO RELATED APPLICATIONS

This application is a continuation-in-part application of U.S. non-provisional patent application Ser. No. 13/630,146 filed on Sep. 28, 2012, which in turn claims benefit from U.S. provisional patent applications: 61/652,743 filed on May 29, 2012; 61/657,999 filed on Jun., 11, 2012; and 61/665,592 filed on Jun. 28, 2012; and this application further claims benefit from U.S. provisional patent applications: 61/658,015 filed on Jun. 11, 2012; 61/658,009 filed on Jun. 11, 2012; 61/665,600 filed on Jun. 28, 2012; and 61/671,417 filed on Jul. 13, 2012, all of which are incorporated herein by reference in their entirety.

FIELD OF THE INVENTION

The present invention relates generally to the field of radio frequency (RF) systems and in particular to systems and methods for enhanced performance of RF systems using RF beamforming and/or digital signal processing.

BACKGROUND OF THE INVENTION

Prior to setting forth a short discussion of the related art, it may be helpful to set forth definitions of certain terms that will be used hereinafter.

The term "MIMO" as used herein, is defined as the use of multiple antennas at both the transmitter and receiver to improve communication performance. MIMO offers significant increases in data throughput and link range without additional bandwidth or increased transmit power. It achieves this goal by spreading the transmit power over the antennas to achieve spatial multiplexing that improves the spectral efficiency (more bits per second per Hz of bandwidth) or to achieve a diversity gain that improves the link reliability (reduced fading), or increased antenna directivity.

The term "beamforming" sometimes referred to as "spatial filtering" as used herein, is a signal processing technique used in antenna arrays for directional signal transmission or reception. This is achieved by combining elements in the array in such a way that signals at particular angles experience constructive interference while others experience destructive interference. Beamforming can be used at both the transmitting and receiving ends in order to achieve spatial selectivity.

The term "beamformer" as used herein refers to RF circuitry that implements beamforming and usually includes a combiner and may further include switches, controllable phase shifters, and in some cases amplifiers and/or attenuators.

The term "Receiving Radio Distribution Network" or "Rx RDN" or simply "RDN" as used herein is defined as a group of beamformers as set forth above.

The term "hybrid MIMO RDN" as used herein is defined as a MIMO system that employ two or more antennas per channel (N is the number of channels and M is the total number of antennas and M>N). This architecture employs a beamformer for each channel so that two or more antennas are combined for each radio circuit that is connected to each one of the channels.

In implementing RDNs, application specific integrated circuits (ASICs) are sometimes used for routing RF signals coming from the antennas to the radio circuits from which they are then conveyed to the baseband modules. ASIC RF routing modules are considered a good design choice due to their low loss, low cost, high Reliability. ASIC design however usually requires preliminary interface definition, and once done, flexibility to interfaces modifications is limited.

FIG. 1 depicts a K input RF beamformer. While K inputs is the maximum, one may use only part of the inputs (for instance, when the implementation provides lower number of inputs); that however comes at the price of combining losses, generated by imbalanced inputs or lack of some of them.

FIG. 2 depicts an N branch RDN with K antennas each. Another level of flexibility may be required vis-à-vis the number of radios fed by an RDN.

It would be therefore advantageous to provide an RF routing module for a Hybrid MIMO RDN architecture that is both variable in the number of connected antennas and the number of MIMO channels while keeping combiner losses at bay.

SUMMARY

Embodiments of the present invention address the challenge of reconfiguring a hybrid MIMO RDN architecture based on a different number of antennas and MIMO channels.

According to one aspect of the present invention, a reconfigurable RF routing module is provided herein. The RF routing module includes M RF inputs and N RF outputs, wherein $N \leq M$. The RF routing module includes a plurality of RF switches arranged to select between incoming RF signals. The RF routing module further includes a plurality of RF combiners arranged to combine RF signals to a single RF signal. The RF routing module further includes a plurality of RF couplers, each associated with a transfer switch and a specified attenuation, wherein the specified attenuation of each one of the plurality of RF couplers is selected so that the RF inputs of each one of the plurality of the RF combiners are combined in a balanced manner. Additionally, the switches, the combiners, and the RF couplers are configured to route any of 1 to M/N of the inputs into each of the N outputs and are further configured to route any of the 1 to K of the inputs to at least one of the N outputs.

According to another aspect of the present invention, the aforementioned RF routing module, possibly in the form of an application specific integrated circuit (ASIC), is provided within the framework of a hybrid MIMO RDN architecture with M antennas and N MIMO channels. Advantageously, the RF routing module eliminates the combiner losses due to imbalanced inputs.

These additional, and/or other aspects and/or advantages of the present invention are set forth in the detailed description which follows.

BRIEF DESCRIPTION OF THE DRAWINGS

For a better understanding of the invention and in order to show how it may be implemented, references are made, purely by way of example, to the accompanying drawings in which like numerals designate corresponding elements or sections. In the accompanying drawings:

FIG. 5A-5D are computational formulas illustrating an aspect of FIG. 4 according to one embodiment of the present invention;

Figure 1:
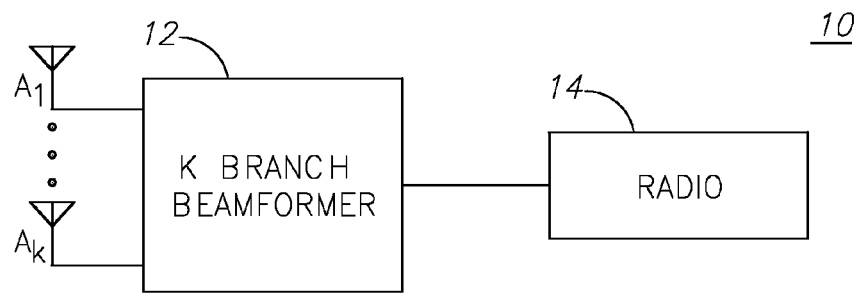
FIG. 1 is a high level block diagram illustrating an aspect of the prior art.
Figure 2:
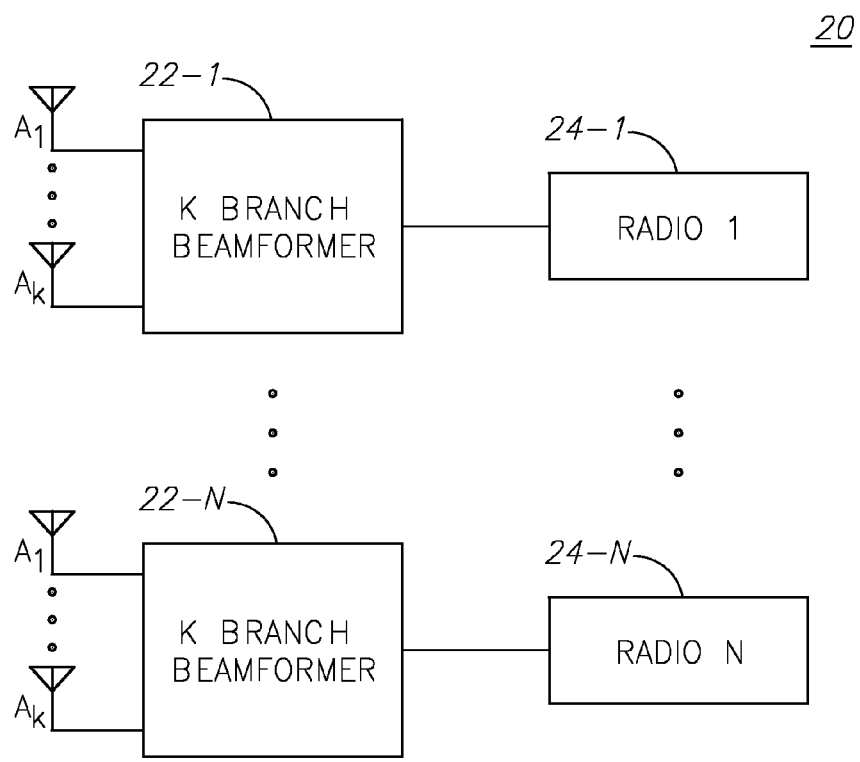
FIG. 2 is a high level block diagram illustrating another aspect of the prior art.

The drawings together with the following detailed description make the embodiments of the invention apparent to those skilled in the art.

DETAILED DESCRIPTION

With specific reference now to the drawings in detail, it is stressed that the particulars shown are for the purpose of example and solely for discussing the preferred embodiments of the present invention, and are presented in the cause of providing what is believed to be the most useful and readily understood description of the principles and conceptual aspects of the invention. In this regard, no attempt is made to show structural details of the invention in more detail than is necessary for a fundamental understanding of the invention. The description taken with the drawings makes apparent to those skilled in the art how the several forms of the invention may be embodied in practice.

Before explaining the embodiments of the invention in detail, it is to be understood that the invention is not limited in its application to the details of construction and the arrangement of the components set forth in the following descriptions or illustrated in the drawings. The invention is applicable to other embodiments and may be practiced or carried out in various ways. Also, it is to be understood that the phraseology and terminology employed herein is for the purpose of description and should not be regarded as limiting.

Figure 3:
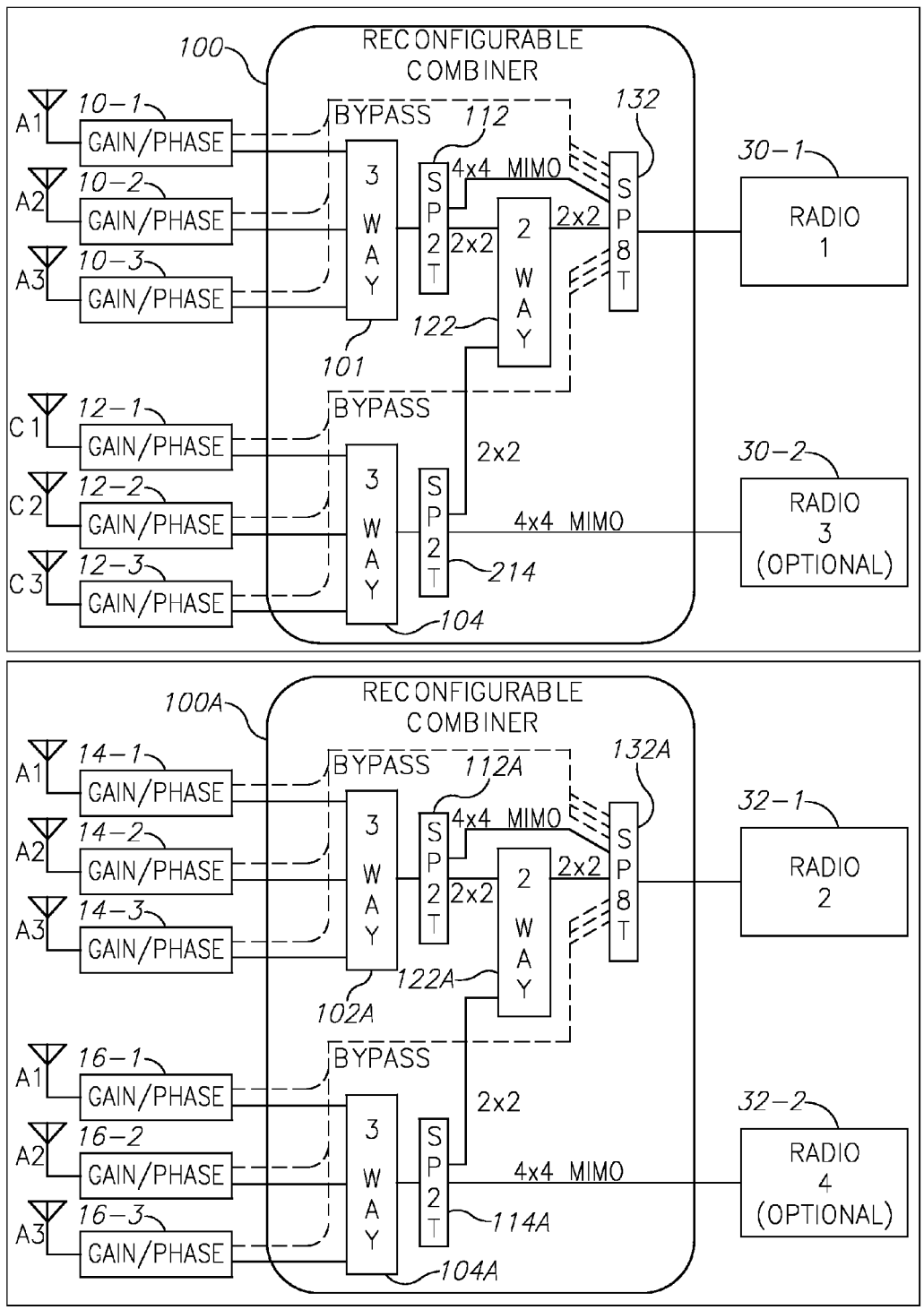
FIG. 3 is a block diagram illustrating an exemplary implementation of the RF routing module according to one embodiment of the present invention.

FIG. 3 is a block diagram illustrating an exemplary non-limiting implementation of the RF routing module according to one embodiment of the present invention. The exemplary implementation includes two reconfigurable combiners 100 and 100A that are fed with antennas A1, A2, A3, C1, C2, and C3, and gain/phase units 10-1, 10-2, 10-3, 12-1, 12-2, 12-3, 14-1, 14-2, 14-3, 16-1, 16-2, and 16-3 respectively. Reconfigurable combiners 100 and 100A include, inter alia, 3 way combiners 101, 104, 102A, and 104A; SP2T switches 112, 214, 112A, and 114A; 2 way combiners 122 and 122A; and single pole 8 throw (SP8T) switches 132 and 132A. Reconfigurable combiners 100 and 100A then feed two to four radio modules 30-1 to 30-2.

In operation, reconfigurable combiners 100 and 100A may be configured to route 1 to 3 antennas to the radio modules and up to six antennas to some of the radio modules.

Figure 4:
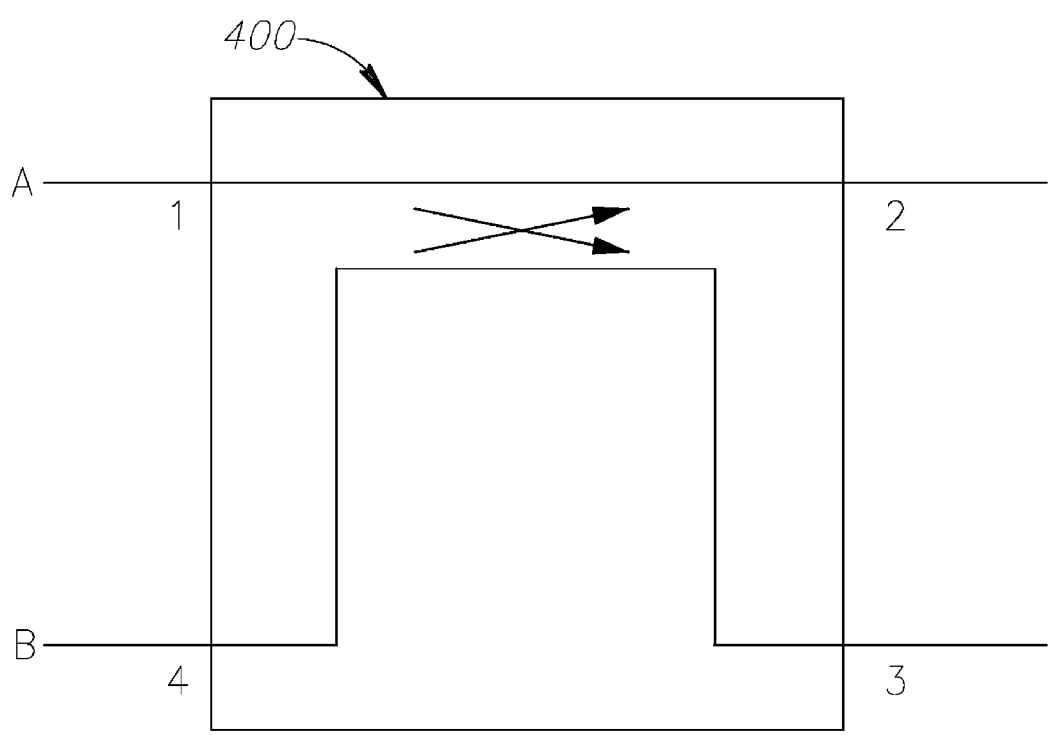
FIG. 4 is a block diagram illustrating an aspect of the combiners used in one embodiment of the invention.

FIG. 4 is a block diagram illustrating an RF coupler 400 according to one embodiment of the present invention. RF coupler 400 is an RF circuitry that enables to add two RF signals so that one of the signals is added to the other signal after some attenuation. In the exemplary RF coupler depicted, port B is added to port A so that the output 2 exhibits an addition of A to an attenuated B port. The RF coupler (which includes a transfer switch and an attenuator) may be used effectively in embodiments of the present invention as described below.

FIG. 5A through 5D are scattering matrices illustrating an aspect of FIG. 4 according to one embodiment of the present invention. The scattering matrix takes the general form of that shown in FIG. 5A. Inspecting the matrix we can see that the imaginary terms show that there is a −90 degree phase shift to the signal applied to port 1 that is output at port 2. Similarly, the signal applied to port 1 and output from port 3 has no imaginary term. The signal applied to port 4 experiences the opposite: a −90 degree phase shift to port 3. The signal amplitudes are distributed according to the coupling ratio of the coupler (affected by the attenuation of the attenuator that implements the RF coupler). FIGS. 5B, 5C, and 5D show the scattering matrices for 3 dB, 4.77 dB and 7 dB couplers respectively. We can see from FIG. 5B that if the relative amplitudes and phases of the signals applied to ports 1 and 4 are equal for the 3 dB coupler and their phases are different by 90 degrees, the signals at one port will cancel and they will add at the other such that the sum of the powers will be output from the other port. A similar result applies for couplers 2 and 3 except the relative signal amplitudes must be at the correct ratio for the full power to appear at the output port (the signal at port 1 must be twice the power than the signal at port 4 for the 4.77 dB coupler and four times for the 7 dB coupler.)

Figure 6:
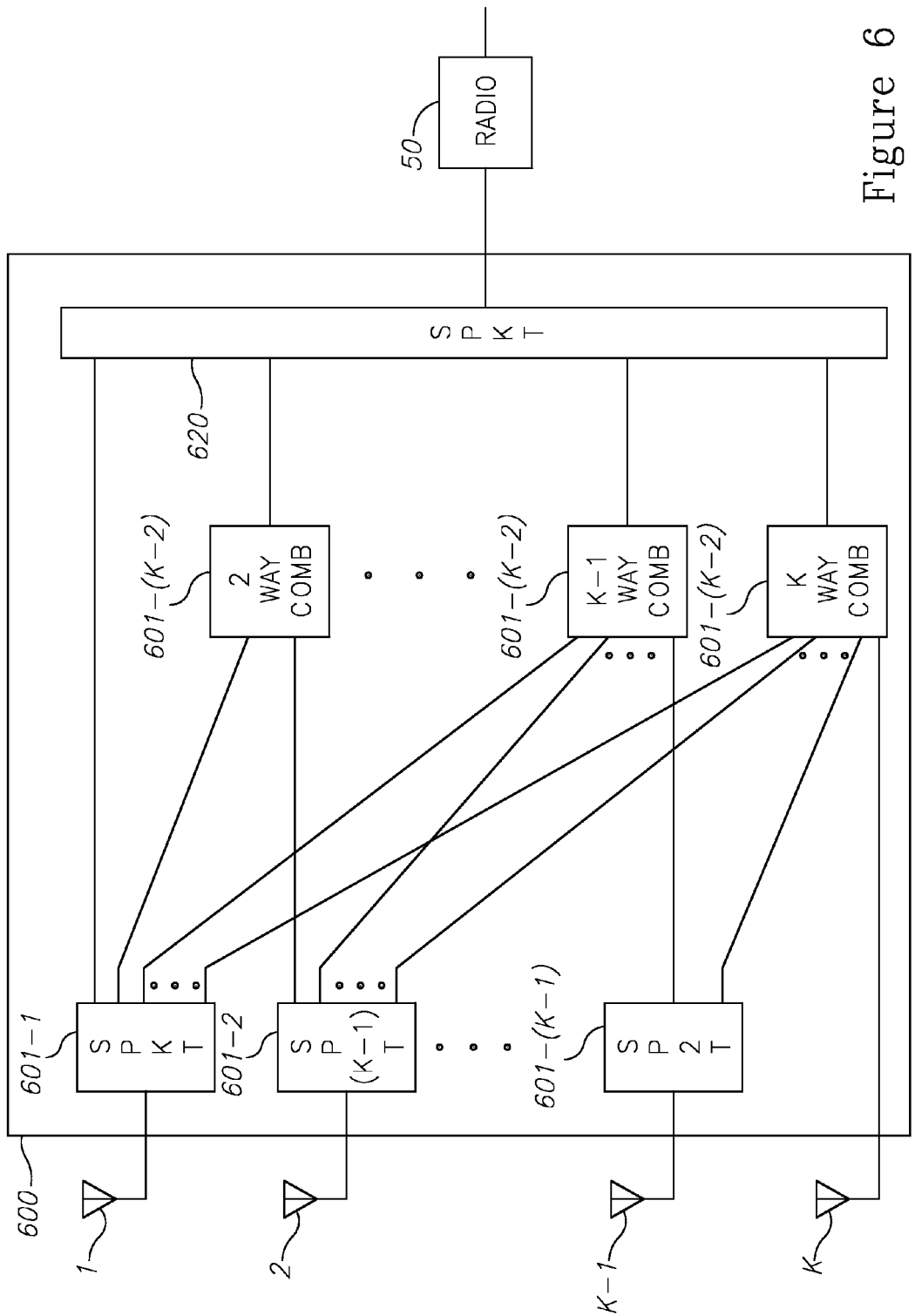
FIG. 6 is a block diagram illustrating an aspect according to some embodiment of the present invention.

FIG. 6 is a block diagram illustrating an aspect according to some embodiment of the present invention. RF routing module 600 presents the straightforward, inefficient design solution for an RF routing module that routes K input antennas 1 thru K, into a module 600 and into a single radio circuit 50. As can bee seen, K−1 different switches are used, single pole 2 throw (SP2T) . . . SP(K−1)T, depicted 601-(K−1) SP2T. In addition, K−1 combiners are used, running from 2-way combiner to a K-way combiner. Finally, a single pole K throw (SPKT) switch is used to feed the outputs of RF routing module 600 to radio circuit 50.

As can be seen in the aforementioned generalized case of RF routing module 600, the number of poles used in the SPDT switches is (K−1+2)*(K−1)/2. A similar number of poles are contributed by the combiners and K+1 poles are added by the SPKT. It can be easily seen that the high number of poles in the straightforward design solution make it an impractical one, due to the high level of combiner losses due to the relative high number of poles.

Figure 7:
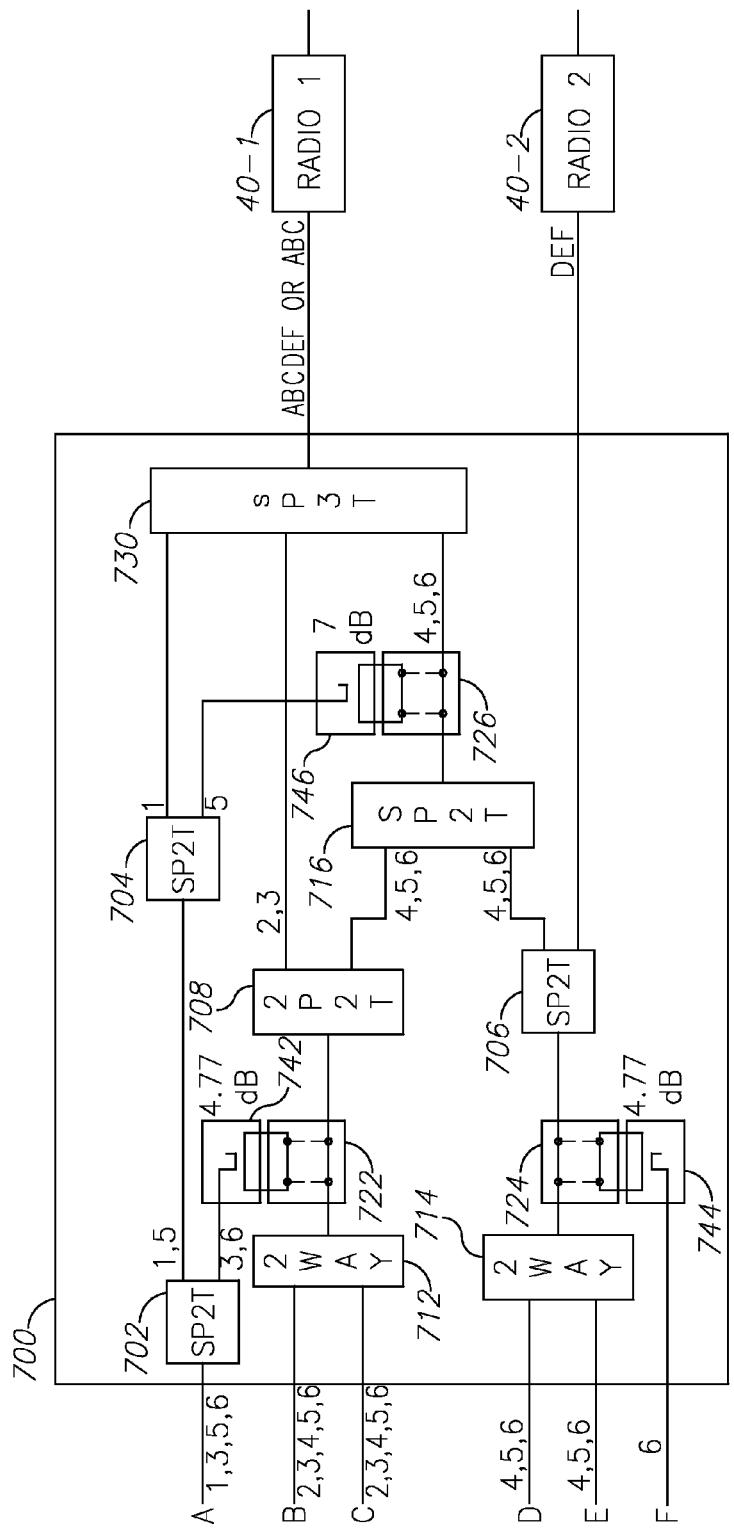
FIG. 7 is a block diagram illustrating an exemplary implementation of the RF routing module according to one embodiment of the present invention.

FIG. 7 is a block diagram illustrating an exemplary implementation of the RF routing module according to one embodiment of the present invention. RF routing module 700 is shown with A-F input antennas and two radio circuits 40-1 and 40-2 that are feeding in turn a MIMO baseband module (not shown here).

RF routing module 700 may, with the right configuration, cater for any required combination of the antennas and the radio circuits so that a configurable number of antennas (inputs) and radio circuits (outputs) may be used. More specifically, as will be shown below, RF routing module 700 may effectively route 3 antennas per radio circuit, 2, antennas per radio circuit, one antenna per radio circuit, and 4, 5, and 6 antennas for one of the radio circuits. RF routing module 700 may well be used for the more trivial design requirements of routing 1, 2, or 3 antennas to any of the radio circuits. Exemplary RF routing module 700 may include several switches (e.g., a single pole two throw SP2T) 702, 704, 706, and 708, and 730 (e.g., a single pole three throw SP3T), several combiners 714, 712, and several transfer switches 722, 724, 726 coupled to respective attenuators 742, 744, and 746. The aforementioned RF circuitries are interconnected so that RF routing module 700 is capable of routing antenna inputs A-F into the radio circuits 40-1 and 40-2.

According to some embodiments of the present invention, a generalized RF routing module is associated with M RF inputs and N RF outputs, wherein M is greater than N. The routing module may include a plurality of RF switches arranged to select between incoming RF signals; a plurality of RF combiners arranged to combine RF signals to a single RF signal; and a plurality of RF couplers, each comprising a transfer switch and an attenuator having a specified attenuation. The specified attenuation of each one of the plurality of attenuators is selected so that the RF inputs of each one of the plurality of the RF combiners are combined in a balanced manner, wherein the switches, the combiners, and the RF couplers (pairs of transfer switches and attenuators) are configured to route any of 1 to M of the inputs into each of the N outputs and are further configured to route any of the 1 to K of the inputs (inputs per beamformer) to at least one of the N outputs.

According to some embodiments of the present invention the RF routing module may include RF combiners that are two way combiners and wherein an RF coupler is used in conjunction with a respective RF combiner, whenever an odd number of RF signals need to be combined. More specifically, the specified attenuation of each one of the plurality of the RF couplers is selected based on a number of inputs of an RF combiner that feeds the transfer switch associated with the respective RF coupler.

According to some embodiments, the RF routing module implements N beamformers, each associated with K antennas and a single radio circuit. More specifically, the RF routing module may be used as a RF distributed network (RDN) in a MIMO receiving system having N receive channels and M receive antennas. In order to address several challenges of the hybrid MIMO RDN architecture, the RF routing module may further include at least one phase shifter and at least one gain control module associated with the M RF inputs.

As will be appreciated by one skilled in the art, aspects of the present invention may be embodied as a system, method or an apparatus. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

In various embodiments, computational modules may be implemented by e.g., processors (e.g., a general purpose computer processor or central processing unit executing software), or DSPs, or other circuitry. The baseband modem may be implanted, for example, as a DSP. A beamforming matrix can be calculated and implemented for example by software running on general purpose processor. Beamformers, gain controllers, switches (e.g. the SPDT), combiners, and phase shifters may be implemented, for example using RF circuitries.

The aforementioned flowchart and block diagrams illustrate the architecture, functionality, and operation of possible implementations of systems and methods according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

We claim:

1. A radio frequency (RF) routing module having a configurable number of RF inputs and a configurable number of RF outputs, comprising:
   a number M of RF inputs;
   a number N of RF outputs, wherein M is greater than N, and M and N are integers;
   a plurality of RF switches arranged to select between incoming RF signals;
   a plurality of RF combiners arranged to combine RF signals to a single RF signal; and
   a plurality of RF couplers, each associated with a transfer switch and an attenuator having a specified attenuation,
   wherein the switches, the combiners, and the RF couplers are configured to route any of number 1 to M of the inputs into at least one of the N outputs such that all combiners used in the route receive RF signals on all inputs thereof.

2. The RF routing module according to claim 1, wherein the RF combiners are two way combiners and wherein an RF coupler is used in conjunction with a respective RF combiner, whenever an odd number of RF signals need to be combined.

3. The RF routing module according to claim 1, wherein the RF routing module is implemented as an application specific integrated circuit (ASIC).

4. The RF routing module according to claim 1, wherein the RF routing module implements N beamformers, associated with M antennas and a single radio circuit.

5. The RF routing module according to claim 1, wherein the specified attenuation of each one of the plurality of the RF couplers is selected based on a number of inputs of an RF combiner that feeds the transfer switch associated with the respective RF coupler.

6. The RF routing module according to claim 1, implemented as a RF distributed network (RDN) in a multiple input multiple output (MIMO) receiving system having N receive channels and M receive antennas.

7. The RF routing module according to claim 1, further comprising at least one at least one gain/phase unit associated with the M RF inputs.

8. A radio frequency (RF) multiple inputs multiple outputs (MIMO) receiving system having a number N channels comprising:
   a number M antennas;
   a number N beamformers, wherein M is greater than N, and M and N are integers;
   a number N radio circuits; and
   an RF routing module including a plurality of RF combiners arranged to combine RF signals to a single RF signal, said RF routing module being configurable to route signals of any number of 1 to M of the antennas into at least one of the N radio circuits such that all combiners used in the route receive RF signals on all inputs thereof.

9. The system according to claim 8, wherein the RF routing module comprises:
   a number M of RF inputs;
   a number N of RF outputs;
   a plurality of RF switches arranged to select between incoming RF signals;
   a plurality of RF combiners arranged to combine RF signals to a single RF signal; and
   a plurality of RF couplers, each associated with a transfer switch and an attenuator having a specified attenuation,
   wherein the specified attenuation of each one of the plurality of RF couplers is selected so that the RF inputs of each one of the plurality of the RF combiners are combined in a balanced manner,
   wherein the RF switches, the RF combiners, and the RF couplers are configured to route any of 1 to M of the inputs into each of the N outputs.

10. The system according to claim 9, wherein the RF combiners are two way combiners and wherein an RF coupler is used in conjunction with a respective RF combiner, whenever an odd number of RF signals need to be combined.

11. The system according to claim 9, wherein the RF routing module is implemented as an application specific integrated circuit (ASIC).

12. The system according to claim 9, wherein the RF routing module implements N beamformers, associated with M antennas and a single radio circuit.

13. The system according to claim 9, wherein the specified coupling ratio of each one of the plurality of the RF couplers is selected based on a number of inputs of an RF combiner that feeds the transfer switch associated with the respective RF coupler.

14. The system according to claim 9, implemented as a RF distributed network (RDN) in a MIMO receiving system having N receive channels and M receive antennas.

15. The system according to claim 9, further comprising at least one at least one gain/phase unit associated with the M RF inputs.

* * * * *